United States Patent [19]
Coussens et al.

[11] Patent Number: 5,532,896
[45] Date of Patent: Jul. 2, 1996

[54] DISTRIBUTED SILICON CONTROLLED RECTIFIERS FOR ESD PROTECTION

[76] Inventors: Eugene Coussens, 900 O'Dell Way, Los Altos, Calif. 94024; Thomas Dungan, 1915 Country Club Rd., Fort Collins, Colo. 80524

[21] Appl. No.: 234,882

[22] Filed: Apr. 26, 1994

[51] Int. Cl.$^6$ ..................................................... H02H 9/04
[52] U.S. Cl. ............................................. 361/56; 361/111
[58] Field of Search .................................. 361/91, 111, 54, 361/56

[56] References Cited

U.S. PATENT DOCUMENTS

| | | | |
|---|---|---|---|
| 4,868,705 | 9/1989 | Shiochi et al. | 361/91 |
| 4,870,530 | 9/1989 | Hurst et al. | 361/91 |
| 4,930,036 | 5/1990 | Sitch | 361/56 |
| 4,996,626 | 2/1991 | Say | 361/91 |
| 5,012,317 | 4/1991 | Rountre | 357/38 |
| 5,359,211 | 10/1994 | Croft | 361/91 |

OTHER PUBLICATIONS

Jaffee, Mark D. et al., "Electrostatic Discharge Protection in a 4–MBIT DRAM," *1990 EOS/ESD Symposium Proceedings*, 1990, pp. 218–223.

Primary Examiner—A. D. Pellinen
Assistant Examiner—Sally C. Medley

[57] ABSTRACT

An electrostatic discharge (ESD) protection circuit for integrated circuitry having a switching ground bus for isolating switching noise includes an ESD protection bus. A first transistor pair includes a PNP transistor and an NPN transistor, with each of the transistors having an emitter connected to a signal input/output pad. A second transistor pair has a PNP transistor and an NPN transistor having emitters connected to the switching ground bus. For each of the PNP transistors, the base is connected to the ESD protection bus and the collector is connected to a "clean" ground bus. For each of the NPN transistors, a base is connected to the clean ground bus and a collector is connected to the ESD protection bus. In this configuration, the PNP of one transistor pair and the NPN of the other transistor pair are able to operate as a distributed silicon controlled rectifier to protect a drive transistor during an ESD event. Optionally, a switching $V_{DD}$ bus may also be incorporated and a third transistor pair having emitters coupled to the switching $V_{DD}$ bus may be employed.

17 Claims, 2 Drawing Sheets

5,532,896

DISTRIBUTED SILICON CONTROLLED RECTIFIERS FOR ESD PROTECTION

TECHNICAL FIELD

The present invention relates generally to an electrostatic discharge protection circuit and more particularly to a protection circuit for input/output circuitry having an isolated, switching ground bus and/or an isolated, switching power bus.

BACKGROUND ART

A circuit component that is particularly susceptible to damage from an electrostatic discharge (ESD) event is an N-channel metal oxide semiconductor (MOS) transistor connected to a signal input/output pad. In a "two-terminal ESD event," a current surge can be injected into a pad connected to one source/drain terminal of the output driver MOS transistor and is extracted from a second pad connected to the other source/drain terminal, so that almost the full ESD voltage develops across the terminals.

In FIG. 1, ESD protection from a surge that enters at a signal input/output pad 10 is provided by a low-impedance shunt 12. The shunt provides a path from the signal pad to a ground bus or ground plane 14 connected to a second pad 16. The low-impedance shunt reduces the risk of damage to a driver transistor 18 and a receiver transistor 20. A diode 22 is incorporated into the circuit to conduct ESD current injected at the pad 16 for exit at the signal pad 10.

In N-well CMOS circuitry, the ground bus 14 is typically connected to the semiconductor substrate of the integrated circuit and to sources of N-channel transistors of core circuitry 24. For each additional signal input/output pad 26, a separate low-impedance shunt 28 and a separate diode 30 are employed to protect the driver transistor 32 and receiver transistor 34 associated with the signal pad. Also shown in FIG. 1 is a positive voltage supply connected at a supply pad 36 to provide $V_{DD}$ for operation of the circuitry.

One difficulty with the circuitry of FIG. 1 is that switching noise generated by operation of transistors 18, 20, 32 and 34 may affect the core circuitry 24 because of the common connection to the ground bus 14. A known solution to isolating switching noise is to provide a separate ground bus for the switching transistors. In FIG. 2, a switching ground bus (or switching ground plane) 38 is connected to pad 40. On the other hand, core circuitry 42 is connected to a substrate ground bus 44 that is joined to a separate pad 46. The source 48 of an N-channel MOS transistor 50 is connected to the switching ground bus 38, while the drain 52 is connected to a signal input/output pad 54. The switching ground bus is sometimes referred to as "dirty ground" or "isolated I/O ground." The substrate ground is also referred to as "clean ground" or "core ground." The two ground buses 38 and 44 are held at the same potential by connections within or outside of the integrated circuit package that houses the circuitry of FIG. 2. A diode is typically included to conduct current from the substrate ground bus 44 to the switching ground bus 38. The diode is typically a parasitic diode formed by the N-channel driver pull down sources in a P-type substrate.

Moving the source 48 of the driver transistor 50 from the "clean" substrate ground bus 44 to the "dirty" switching ground bus 38 isolates the switching noise, but it also reduces the ESD protection provided by circuits having a low-impedance shunt 12 of the type shown in FIGS. 1 and 2. For two reasons, the conduction of ESD current from a signal pad 54 to an isolated ground bus 38 to which the sources 48 of driver transistors are connected is more severe than the conduction of ESD current from a signal pad to a substrate ground to which the sources are connected. Firstly, in the isolated ground approach the drain-to-source voltage experienced by the driver transistor 50 increases to the sum of the signal-to-ground voltage plus the voltage drop across the additional forward-biased parasitic diode from clean ground to dirty ground. Secondly, in the clean-ground approach, the source and drain junctions of the output drivers are both at zero or reverse bias until one of the junctions reaches the breakdown voltage and the driver "snaps back," whereas the substrate-to-source junction in the dirty-ground approach of FIG. 2 is immediately driven into forward bias by the current that passes from the clean substrate ground bus 44 to the dirty switching ground bus 38.

What is needed is an ESD protection circuit for integrated circuits that use isolated switching buses, wherein ESD current is non-destructively conducted whether injected at an input/output pad or a common bus.

SUMMARY OF THE INVENTION

The invention utilizes a bipolar transistor pair connected to each signal pad and to each isolated bus of an integrated circuit having separate buses to isolate noise generated by input/output drive circuitry. Electrostatic discharge (ESD) protection is principally provided by distributed silicon controlled rectifiers formed by a PNP transistor connected to a first pad, such as a signal input/output pad, and an NPN transistor connected to a second pad, such as a switching ground pad.

In a preferred embodiment, a first transistor pair is coupled to the signal input/output pad. Each of a PNP transistor and an NPN transistor has an emitter joined to the signal pad. The base of the PNP transistor and the collector of the NPN transistor are connected to an ESD protection bus. The ESD protection bus is a supply bus of a positive voltage and optionally may be the $V_{DD}$ bus. The collector of the PNP transistor and the base of the NPN transistor are joined to substrate ground, i.e., "clean ground."

A second transistor pair is connected in a manner identical to the first transistor pair, but the emitters of the PNP transistor and the NPN transistor of the second pair are coupled to the switching ground bus, i.e., "dirty ground." It is the PNP transistor of the first transistor pair and the NPN transistor of the second transistor pair that define a distributed silicon controlled rectifier for protecting circuitry during ESD events in which current is injected into the signal pad and extracted from the pad to which the switching ground bus is connected. On the other hand, the PNP transistor of the second pair and the NPN transistor of the first pair define the distributed silicon controlled rectifier for protection during ESD events in which current is conducted in the opposite direction.

Optionally, a low-impedance shunt may be incorporated into the circuitry. The shunt may be connected from the ESD protection bus to substrate ground, so as to provide conductance from the ESD protection bus to substrate ground in response to a current surge into the ESD protection bus. However, if the core circuitry is sufficiently robust, the shunt may be deleted.

For an ESD event in which current is injected into the signal input/output pad, as the capacitance of the signal pad changes, the electrical potential between the pad and the switching ground bus will begin to rise. After the voltage at the signal pad exceeds a diode drop, current will begin to flow into the PNP emitter of the first transistor pair. The current will be primarily in the direction of the ESD protection bus, which after reaching the threshold voltage of the shunt will conduct current to the substrate ground bus. Additionally, a fraction of the injected emitter current will be conducted directly to the substrate ground bus via the collector of the PNP transistor of the first transistor pair. One path for current to travel to the switching ground bus is from the substrate ground bus through the base-emitter junction of the NPN transistor of the second transistor pair. A second path is formed when this base-emitter junction is forward biased, so that the collector current of the NPN transistor provides a shunt path from the ESD protection bus to the switching ground bus. During the ESD event, the distributed silicon controlled rectifier is activated and current flows through the ESD protection bus. During normal operation, the distributed silicon controlled rectifier is held "off" by fixing the ESD protection bus at some positive potential, such as $V_{DD}$.

If the ESD current is injected into the switching ground bus and extracted from the signal input/output pad, the relevant distributed silicon controlled rectifier is the one formed by the PNP transistor of the second transistor pair and the NPN transistor of the first transistor pair. Operation will be substantially identical to the operation described above.

An optional third transistor pair may be utilized if a switching $V_{DD}$ bus is utilized to further isolate switching noise from core circuitry. The connections of PNP and NPN transistors of the third pair may be identical to connections of the PNP and NPN transistors of the first and second pairs, but the emitters of the third pair should be connected to the switching $V_{DD}$ bus. The transistors of the third pair form various distributed silicon controlled rectifiers with transistors of the other two pairs, depending upon the flow path of ESD current.

In many prior art ESD protection circuits, a forward-biased diode is required from the switching ground bus to the substrate ground that is to be used to carry the ESD current. An advantage of the present invention is that this diode path from the switching ground bus to the substrate is not required, so that the switching ground bus is free to be pulled above substrate ground during any stress event not extracting current from the switching ground bus. Thus, the drain-to-source voltage of a driver transistor is reduced during the stress event. For example, when current is injected into the signal input/output pad and extracted from the substrate ground, no protection NPN transistor is activated to form a distributed silicon controlled rectifier with the PNP transistor of the first transistor pair. The only ESD current shunt paths provided in such a case are through the PNP collector of the first transistor pair and through the low-impedance shunt. Capacitive coupling and any initial driver transistor snapback currents will pull the switching ground bus above substrate ground, limiting the drain-to-source voltage of the driver transistor.

BEST MODE FOR CARRYING OUT THE INVENTION

Figure 1:
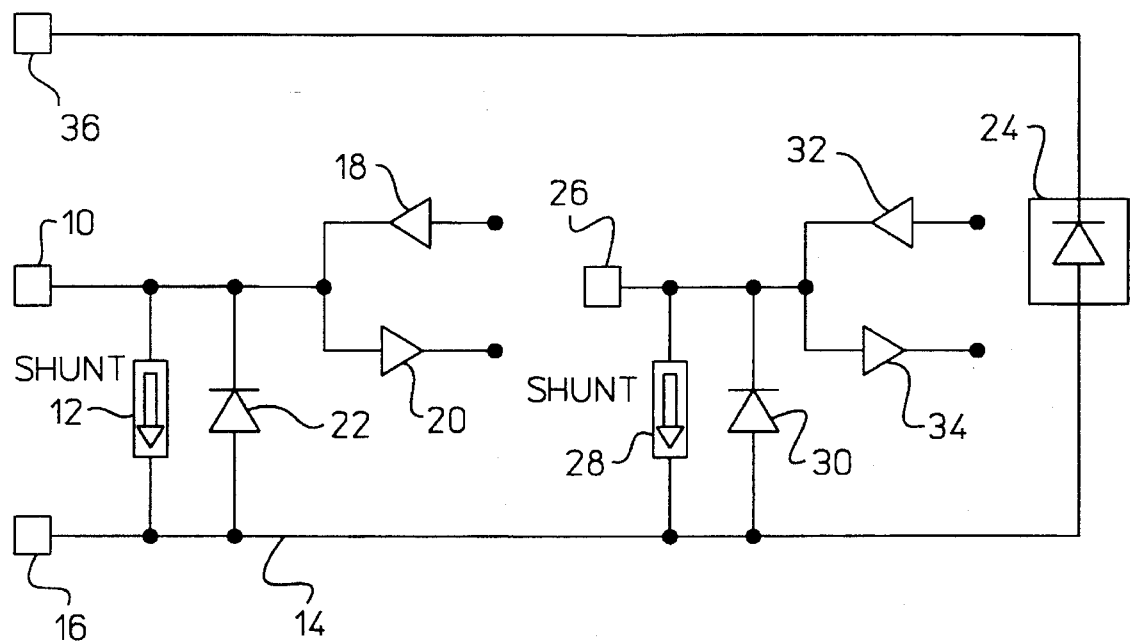
FIG. 1 is a schematic circuit diagram of an integrated circuit showing a prior art electrostatic discharge protection circuit.
Figure 2:
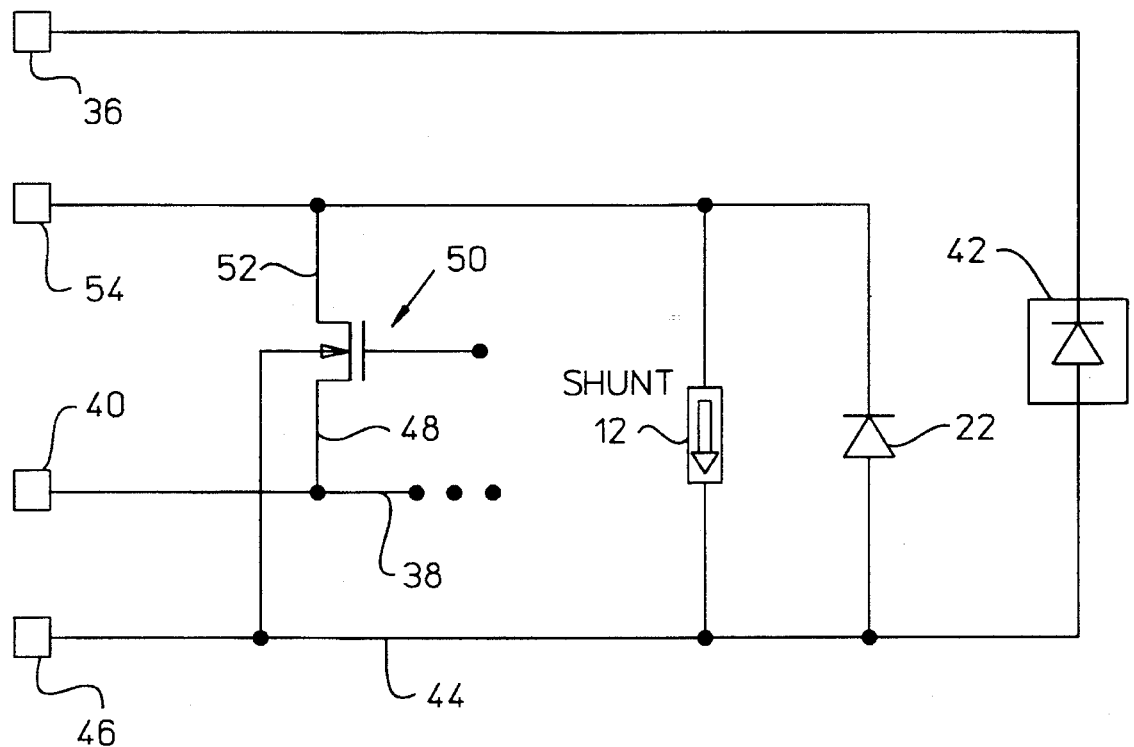
FIG. 2 is a schematic circuit diagram of a prior art circuit that utilizes an isolated switching ground bus.
Figure 3:
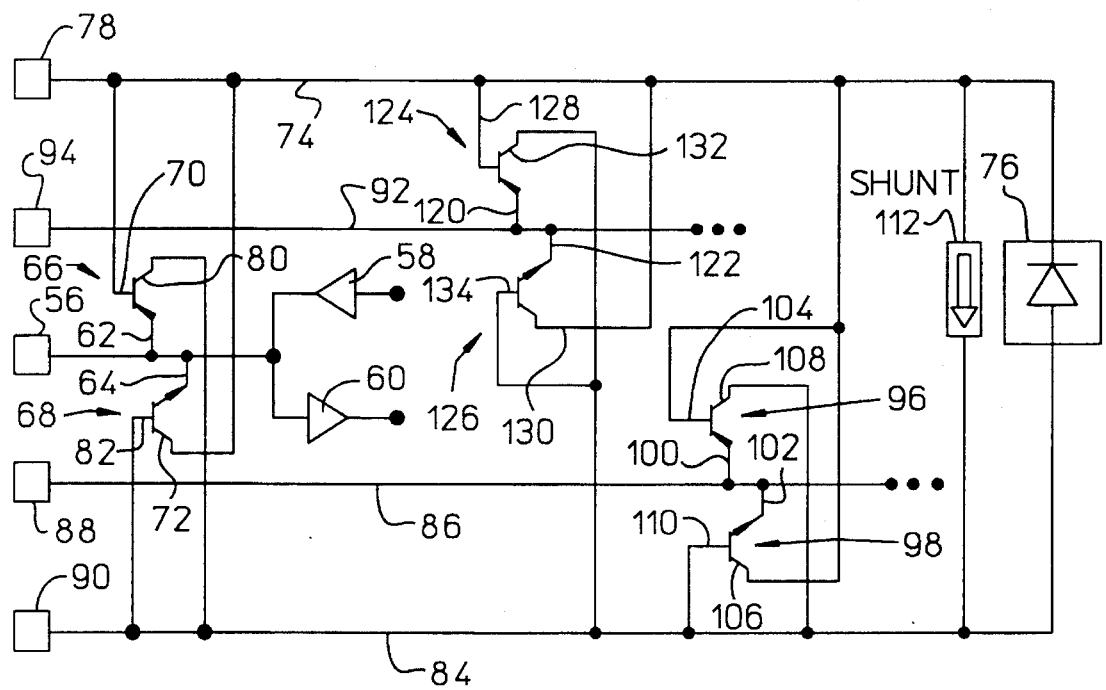
FIG. 3 is a schematic circuit diagram of an electrostatic discharge protection circuit in accordance with the invention.

With reference to FIG. 3, a signal input/output pad 56 is connected to a driver transistor 58 and a receiver transistor 60. The driver and receiver transistors are MOS devices that are connected in the circuit in a conventional manner. Typically, the driver transistor 58 is an N-channel MOS transistor.

Also connected to the signal pad 56 are emitters 62 and 64 of a first pair of transistors, composed of a PNP transistor 66 and an NPN transistor 68. The base 70 of the PNP transistor and the collector 72 of the NPN transistor are tied to an electrostatic discharge (ESD) protection bus 74. The protection bus 74 may be a $V_{DD}$ supply bus for core circuitry 76, but this is not critical. During normal operation, the protection bus will be held high by connection of the bus to a supply at a pad 78. The collector 80 of the PNP transistor and the base 82 of the NPN transistor are joined to a substrate ground bus 84.

The substrate ground bus is a "clean" ground bus, since it is isolated from the switching noise generated by operation of the MOS transistors 58 and 60. Necessary ground connections for the MOS transistors are provided by a switching ground bus 86. The switching ground bus is joined to a pad 88, while the substrate ground bus 84 is connected to a separate pad 90. The two ground buses are isolated on the chip, but are tied together off of the chip. Optionally, a switching $V_{DD}$ bus 92 can be utilized to further isolate the switching noise. That is, a "dirty" $V_{DD}$ having a contact pad 94 may be employed to power the input/output transistors 58 and 60.

A second transistor pair includes a PNP transistor 96 and an NPN transistor 98. The transistors of the second pair are connected in the same manner as the transistors 66 and 68 of the first pair, with the exception that the emitters 100 and 102 of the second pair are connected to the switching ground bus 86, rather than the signal pad 56. Thus, the base 104 of the PNP transistor and the collector 106 of the NPN transistor are tied to the ESD protection bus 74, while the collector 108 of the PNP transistor and the base 110 of the NPN transistor are joined to the substrate ground bus 84.

For the occurrence of an ESD event that results in a current surge into the protection bus 74, some conductance from the ESD protection bus to the substrate ground bus 84 should be provided. The conductance can be achieved in several ways. In the simplest form, the protection bus 74 is the $V_{DD}$ supply for the core circuitry 76, and the short-pulse response of the active core circuitry provides the necessary conductance. However, if the core circuitry is not sufficiently robust or is not otherwise able to achieve the conductance, supplemental circuitry may be provided. In FIG. 3, a low-impedance shunt 112 is shown. The devices represented by the shunt 112 may vary according to considerations known by persons skilled in the art. Only as examples, the shunt may be a large capacitance of the protection bus 74 to the substrate, or may be an N-channel MOS transistor with a drain connected to the protection bus and a source connected to the substrate bus, with a voltage-divider circuit to turn on the gate when the protection bus-to-substrate voltage exceeds some predetermined threshold conditions.

Figure 4:
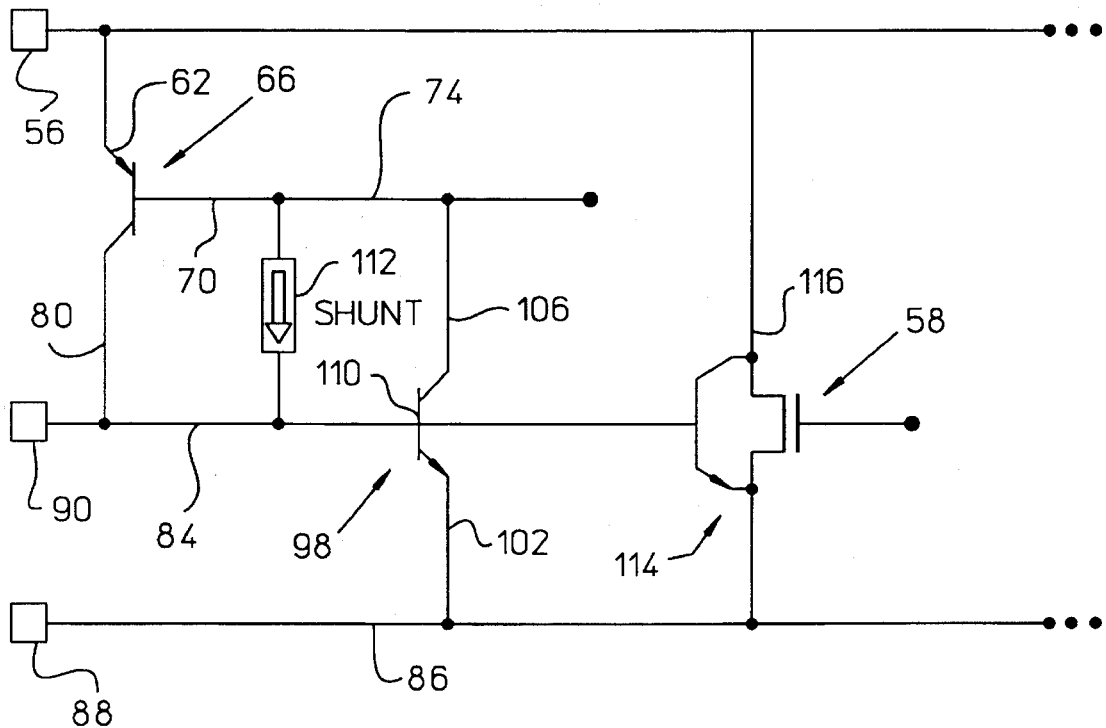
FIG. 4 is a schematic circuit diagram of a distributed silicon controlled rectifier formed by the circuit of FIG. 3.

Referring now to FIGS. 3 and 4, an ESD event in which current is injected into the signal input/output pad 56 and extracted from the switching ground pad 88 will be set forth. This is the event of greatest concern in the operation of conventional circuits. Prior to the ESD stress, all of the pads are assumed to be floating and the nodes of the circuits are assumed to be at a common potential.

Injecting current at the signal pad 56 causes a rise in the electrical potential between the signal pad and the switching ground bus 86 as it changes the capacitance associated with the signal input/output pad 56. When the electrical potential at the signal pad exceeds a diode voltage drop, current begins to flow from the emitter 62 of the PNP transistor 66 to the ESD protection bus 74. The low-impedance shunt 112 is a first source for conducting current from the ESD protection bus to the substrate ground bus 84. Current will conduct through the shunt 112 when the threshold voltage of the shunt is reached. The threshold voltage is dependent upon the selected shunt circuit, as is known by persons skilled in the art. Optionally, the threshold voltage is zero volts. A second path to the substrate ground bus is a direct path from the emitter 62 of the PNP transistor 66 via the collector 80 of the PNP transistor.

There are two current paths to the switching ground bus 86 for the non-destructive exit of ESD current through the pad 88. Firstly, current conducts from the substrate ground bus 84 to the switching ground bus 86 through the base-emitter junction of the NPN protection transistor 98. A second current path is via the collector 106 of the NPN transistor 98 when the base-emitter junction of the NPN transistor is forward biased. This second current path is from the ESD protection bus 74 to the switching ground bus 86.

Protection is primarily provided by the "distributed silicon controlled rectifier" formed by the PNP transistor 66 at the signal pad 56 and the NPN transistor 98 at the switching ground bus 86. A "distributed" silicon controlled rectifier is defined herein as a conventional silicon controlled rectifier circuit formed by spaced apart transistors, rather than by a four layer structure that is typical of silicon controlled rectifiers. In the preferred embodiment, the bipolar transistors are parasitic devices formed during processing steps for fabricating MOS transistors. However, BiCMOS processing may also be utilized. During normal circuit operation, the distributed silicon controlled rectifier is held "off" by maintaining the ESD protection bus 74 at a fixed positive potential.

If the ESD event is one in which current is injected into the pad 88 connected to the switching ground bus 86 and extracted from the signal input/output pad 56, the distributed silicon controlled rectifier defined by the PNP transistor 96 of the second transistor pair and the NPN transistor 68 of the first transistor pair. That is, the relevant circuit will be identical to FIG. 4, with the exception that pads 56 and 88 and the associated circuitry are transposed. The operation of the second distributed silicon controlled rectifier is identical to the operation described with reference to FIG. 4.

Unlike many conventional ESD protection circuits, there is no forward-biased diode path from the switching ground bus to the substrate. Thus, the switching ground bus is free to be pulled above substrate ground during any stress event that does not require extracting current from the switching ground bus. This reduces the drain-to-source voltage of the MOS driver transistor 58 during the stress event. For example, when current is injected into the signal pad 56 and extracted from the substrate ground pad 90, no protection NPN transistor will be activated to form a distributed silicon controlled rectifier with the PNP transistor 66 of the first transistor pair. The only ESD current shunt paths provided in this case are through the collector 80 of the PNP transistor 66 and through the low-impedance shunt 112. However, capacitive coupling and any initial driver transistor snapback currents will pull the switching ground bus 86 above substrate ground, limiting the electrical potential of the drain 116 to the source 118 of the N-channel MOS transistor.

The source/drain voltage developed across the driver transistor 58 will depend upon the current gains and the base-emitter voltage drops of the PNP and NPN transistors 66 and 98 of the distributed silicon controlled rectifier that protects the drive transistor during a particular ESD event. The current levels during an ESD event drive the activated bipolar transistors into their high-level gain-rolloff region of operation, in which the ratio of the collector current to the base current decreases with increasing current substantially as the inverse of the collector current density. For a given emitter current, the collector density decreases with increasing device dimensions, so that bipolar gains during an ESD event will increase with any increase in the size of the device. The base-emitter voltage drop at a given current level will also decrease with increasing device size. The bipolar transistors 96 and 98 connected to the substrate ground bus do not capacitively load any of the signals. Thus, these bipolar transistors can be made as large as the area restrictions of a particular semiconductor chip allow.

As previously noted, the circuit of FIG. 3 optionally includes a switching $V_{DD}$ bus 92. Connected to the bus 92 are emitters 120 and 122 of a PNP transistor 124 and an NPN transistor 126. The transistors 124 and 126 form a third transistor pair. In the same manner as the transistors 66 and 68 of the first transistor pair, the ESD protection bus 74 is connected to the base 128 of the PNP transistor 124 and the collector 130 of the NPN transistor 126. The collector 132 of the PNP transistor and the base 134 of the NPN transistor are connected to the substrate ground bus 84. Thus, the PNP transistor 124 can operate as one transistor of a distributed silicon controlled rectifier for circumstances in which ESD current is injected at the pad 94 of the switching $V_{DD}$ bus 92. The NPN transistor that operates as the second transistor of the distributed silicon controlled rectifier will depend upon whether the ESD current is extracted from pad 56 or pad 88. The NPN transistor 126 of the third pair is able to operate with either the PNP transistor 66 or the PNP transistor 96 if injected ESD current is to be extracted from the pad 94.

We claim:

1. An electrostatic discharge (ESD) protection circuit for integrated circuitry having a signal line, a first ground bus and a switching ground bus comprising:

an ESD protection bus;

a first transistor pair having a first PNP transistor and a first NPN transistor, said first PNP transistor having a base connected to said ESD protection bus and to a collector of said first NPN transistor; and a second transistor pair having a second PNP transistor and a second NPN transistor, said second PNP transistor having a base connected to said ESD protection bus and to a collector of said second NPN transistor;

said first ground bus connected to a collector of each of said PNP transistors and to a base of each of said NPN transistors, said signal line connected to an emitter of each of said first PNP transistor and said second NPN transistor, said switching ground bus connected to an emitter of each of said second PNP transistor and said first NPN transistor.

2. The circuit of claim 1 wherein said ESD protection bus is connected to a source of positive voltage.

3. The circuit of claim 1 further comprising a shunt means connecting said protection bus to said first ground bus for conducting current upon occurrence of an ESD event.

4. The circuit of claim 1 further comprising a third PNP transistor and a third NPN transistor, said third PNP and NPN transistors having emitters connected to a switching voltage source, said third PNP transistor having a base and a collector respectively connected to said bases and said collectors of said first and second PNP transistors, said third NPN transistor having a base and a collector respectively connected to said bases and said collectors of said first and second NPN transistors.

5. The circuit of claim 4 wherein said switching voltage source is a first source of $V_{DD}$ and wherein said protection bus is a second source of $V_{DD}$.

6. The circuit of claim 1 further comprising a MOS driver transistor having a drain connected to said signal line and having a source connected to said switching ground bus.

7. The circuit of claim 1 wherein each of said signal line and said switching and first ground buses includes at least one contact pad.

8. The circuit of claim 1 wherein said first and second transistor pairs are distributed silicon controlled rectifiers.

9. An electrostatic discharge (ESD) protection circuit for integrated circuitry comprising:

first pad means for providing a first ground plane;

second pad means for providing a switching ground plane;

signal pad means for input/output of an electrical signal;

a driver transistor having a first source/drain connected to said signal pad means and a second source/drain connected to said second pad means;

a first transistor pair having a first PNP transistor and a first NPN transistor, each first transistor having an emitter electrically joined to said signal pad means, said first pad means being joined to a base of said first NPN transistor and to a collector of said first PNP transistor;

a positive voltage bus connected to each of a base of said first PNP transistor and a collector of said first NPN transistor; and a second transistor pair having a second PNP transistor and a second NPN transistor, each second transistor having an emitter electrically joined to said second pad means, said first pad means being joined to a base of said second NPN transistor and to a collector of said second PNP transistor, said positive voltage bus connected to each of a base of said second PNP transistor and a collector of said second NPN transistor.

10. The circuit of claim 9 further comprising a low impedance shunt circuit having an input connected to said positive voltage bus and having an output connected to said first pad means.

11. The circuit of claim 9 wherein said first PNP transistor and said second NPN transistor form a first distributed silicon controlled rectifier and wherein said first NPN transistor and said second PNP transistor form a second distributed silicon controlled rectifier.

12. The circuit of claim 9 further comprising a third transistor pair having a third PNP and a third NPN transistor, said third transistor pair having emitters connected to a positive supply pad, said third PNP transistor having a base joined to said positive voltage bus and having a collector joined to said first pad means, said third NPN transistor having a base joined to said first pad means and having a collector joined to said positive voltage bus.

13. The circuit of claim 9 wherein said signal pad means is connected to a driver field effect transistor and a receiver field effect transistor.

14. An electrostatic discharge (ESD) protected circuit comprising:

a first distributed silicon controlled rectifier (SCR) having a PNP transistor and an NPN transistor;

a second distributed SCR having a PNP transistor and an NPN transistor;

a signal input/output pad connected to emitters of said PNP transistor of said first distributed SCR and said NPN transistor of said second distributed SCR;

a dirty ground pad connected to emitters of said PNP transistor of said second distributed SCR and said NPN transistor of said first distributed SCR;

a clean ground pad connected to bases of each of said NPN transistors and to collectors of each of said PNP transistors;

an ESD protection bus connected to bases of each of said PNP transistors and to collectors of each of said NPN transistors; and a low impedance shunt having an input connected to said ESD protection bus and having an output connected to said clean ground pad.

15. The circuit of claim 14 wherein said ESD protection bus is coupled to a source of positive voltage.

16. The circuit of claim 14 further comprising a driver transistor having a source connected to said signal input/output pad and a drain connected to said dirty ground pad.

17. The circuit of claim 16 wherein said driver transistor is an N-channel MOS transistor.

* * * * *